Nov. 28, 1967   W. D. PILE   3,354,927
RIM STRUCTURE
Filed Dec. 1, 1965

INVENTOR.
WILLIAM D. PILE
BY
*J.B. Holden*
ATTORNEY

United States Patent Office 3,354,927
Patented Nov. 28, 1967

3,354,927
RIM STRUCTURE
William D. Pile, Stow, Ohio, assignor to The Goodyear Tire & Rubber Company, Akron, Ohio, a corporation of Ohio
Filed Dec. 1, 1965, Ser. No. 510,901
5 Claims. (Cl. 152—410)

ABSTRACT OF THE DISCLOSURE

A multiple-piece vehicle rim for use with large tubeless tires having a side flange retaining lock ring with an axially inwardly facing rib which directs radial loads against the rim base at a location axially inwardly of the lock ring retaining gutter, thereby eliminating stresses in the axially outer edge of the rim base.

---

This invention relates to multiple-piece vehicle rims such as those used with large tubeless tires on earth movers and other similar heavy duty off-the-road equipment.

Rim structures of this general type are well known in the prior art and typical examples of such rims may be seen in U.S. Patents No. 2,835,303 granted to A. W. Woodward, and No. 3,043,358 granted to R. H. Scott. The problems of mounting and demounting such large tubeless tires and the need for removable side flanges and removable bead seat bands are well described in the above-mentioned patents and in the interest of brevity will not be discussed in detail in this application.

One of the major problems encountered in prior art devices is that when a tire is mounted on a rim and inflated, the inflation pressure combined with the vehicle load forces the tire against the removable bead seat band. These forces combined with the effects of dynamic motion create undesirable radial and axial stresses in the gutter edge portion of the rim base which may sometimes result in fracture of the rim base and other portions of the rim structure.

The Scott Patent No. 3,043,358 has shown a means of removing the stress from the gutter edge portion of the rim base by providing special raised seating surfaces on both the rim base and the bead seat band so that the radial forces are transmitted directly from the bead seat band to the main body of the rim base rather than through the split lock ring. In the Scott patent the lock ring receives only axial loads from the bead seat band. The difficulty encountered with this structure is the necessity of maintaining extremely close tolerances between the special seating surfaces and the additional cost of machining the surfaces to such close tolerances. In addition, the seating surfaces, because of the clearances therebetween, are in radial contact only in the area where the radial load is being transmitted. This results in flexing of the bead seat band and a tendency for a planetary action of the bead seat band relative to the rim base.

The primary object of this invention is to provide a multiple-piece wheel rim structure in which severe stress concentrations in the gutter edge portion of the rim base are eliminated by transmitting loads from the bead seat band to the main body of the rim base through a simplified split lock ring.

Another object of the invention is to provide a wheel rim in which the need for special bearing surfaces on the rim base and the bead seat band is eliminated.

A still further object of the invention is to prevent flexing of the bead seat band of a multi-piece wheel rim.

Figure 1:
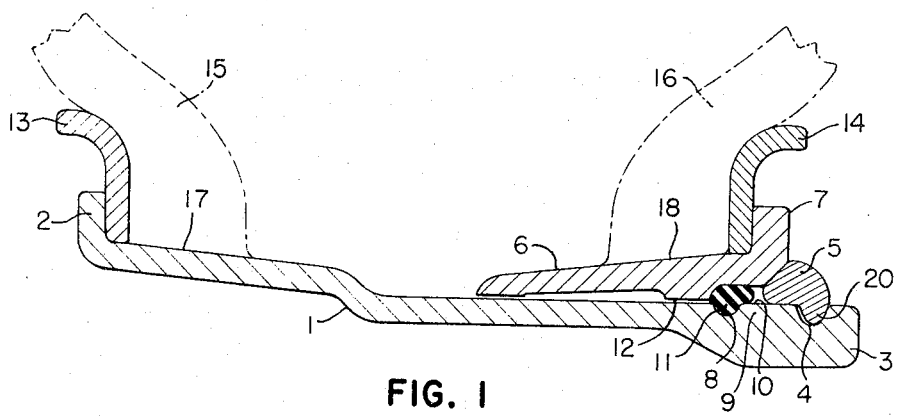
FIG. 1 is a cross-sectional view of a typical tire rim of the invention.
Figure 2:
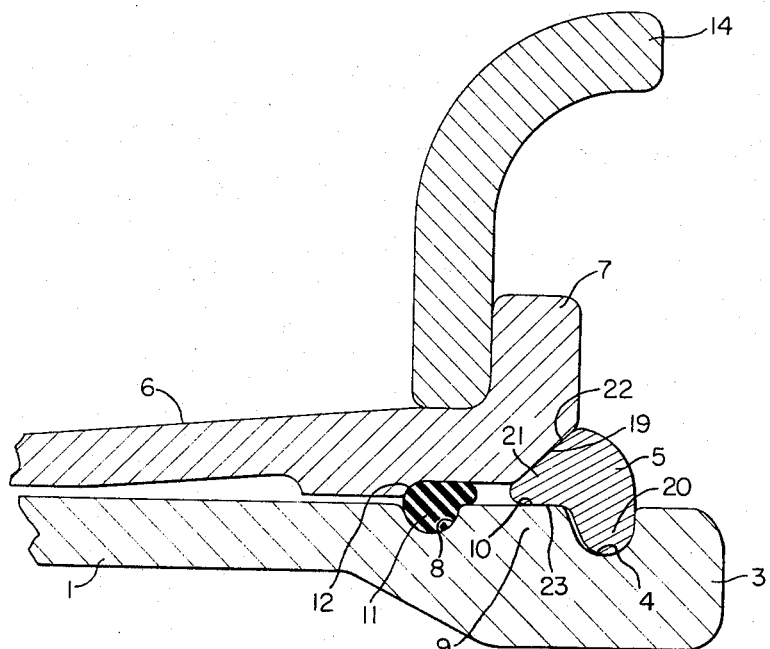
FIG. 2 is an enlarged partial section of the rim of FIG. 1.

In FIG. 1 a typical multiple-piece rim assembly for large off-the-road or earth mover tubeless or tube-type tires is shown in which the numeral 1 represents an endless rim base having a side ring retaining flange 2 extending radially outwardly along one edge thereof and an integral gutter edge portion 3 along the opposite edge. The gutter edge portion 3 has an endless radially outwardly facing gutter or channel 4 into which a split lock ring 5 is mounted to engage an annular bead seat band 6 which telescopes over the rim base 1 and is spaced radially outwardly therefrom. The bead seat band 6 has a radially inner and a radially outer face and a side ring retaining flange 7 extending radially outwardly from its axially outer edge. An annular channel 8 is spaced axially inwardly on the rim base 1 from the gutter 4 thereby forming a radially outwardly facing annular ledge 9 therebetween. A lock ring seating surface 10 formed by the flat radially outer face of the ledge 9 lies in the same plane as the adjacent portions of the radially outer face of the rim base 1. An O-ring 11 is located between the bead seat band 6 and the rim base 1 in the channel 8 so that when the bead seat band 6 is in the assembled position on the base 1, the O-ring 11 is distorted under axial and radial stresses by an annular shoulder 12 on the radially inner face of the bead seat band 6 to seal the passageway between the rim base 1 and the bead seat band 6.

An endless flanged side ring 13 telescopes over the rim base 1 and engages the retaining flange 2 to fix the position thereof. A similar flanged side ring 14 telescopes over the bead seat ring 6 and engages the retaining flange 7. The side rings 13 and 14 engage the beads 15 and 16 of a tire (not shown) when mounted on the rim to retain it in position thereon.

When the tire is mounted on the rim assembly, the bead 15 seals against the bead seat portion 17 which lies axially inwardly on the rim base 1 from the assembled side ring 13 and the bead 16 seals against a bead seat portion 18 which lies axially inwardly from the assembled side ring 14 on the endless bead seat band 6.

The axially outer and radially inner corner of the bead seat band 6 is beveled to form a seating surface 19 which lies above ledge 9 in the assembled position. The lock ring 5 has a radially inwardly extending body portion 20 which extends into the gutter 4 and an axially inwardly extending annular rib 21 which lies over and seats on ledge 9 of rim base 1. The upper portion of the rib 21 is beveled to form seating surface 22 which mates with surface 19 of the bead seat band 6 to provide positive concentric positioning of bead seat band 6 with respect to the rim base 1. The lower face of the rib 21 forms a seating surface 23 which engages the seating surface 10 on the ledge 9 and limits the radially inward deflection of the lock ring 5 when it is subjected to loads from the bead seat band 6.

When the tire is mounted on the rim and the rim is fully assembled with the bead seat band 6 secured on the rim base 1 by the lock ring 5, the internal inflation pressure of the tire causes the beads 15 and 16 to move axially outwardly to engage the side rings 13 and 14 respectively. The tire pressure against the side rings 13 and 14 holds the bead seat band 6 tightly against the split lock ring 5 and forces the seating surface 19 on the bead seat band 6 against the seating surface 22 on the lock ring 5 and moves the lock ring axially outwardly until the body portion 20 seats against an outer side of the gutter 4. Since the seating surfaces 22 and 23 on the rib 21 are inclined at an acute angle to each other, the continuing pressure of the band 6 creates a radially inward wedging force against the rib 21. Because of the rounded contour of the body 20 of the lock ring 5 it tends to roll within the gutter 4 and permit the rib 21 upon pressure from the bead seat band 6 to be forced radially inwardly against the seating surface 10 on the ledge 9, thereby directing a substantial portion of the radial loads from the bead seat band 6 onto the ledge 9 in lieu of the gutter edge portion 3 of the rim base 1.

So long as internal pressure is maintained in the tire, the bead seat band 6, the lock ring 5, and the rim base 1 are always in radial contact for the full 360° of the annular seating surfaces 10, 19, 22, and 23. This positively centers the bead seat band 6 concentrically with respect to the rim base 1 to prevent flexing of the bead seat band 6 and the resulting tendency of a planetary motion between the rim base 1 and the bead seat band 6.

In addition to the wedging force created against the rib 21 by the axially outward force of the bead seat band 6, the tire imparts radial forces to the bead seat band 6 in line with the point of ground contact of the tire. The seated position of the lock ring 5, as previously discussed, prevents flexing of the bead seat band 6 and the planetary motion between the band 6 and rim base which would otherwise result from the radial forces from the tire.

It will be seen from the foregoing description that the lock ring 5 is specifically designed with an axially inwardly facing flange to transmit loads radially from the bead seat band 6 to the main portion of the rim base 1 rather than to the gutter edge portion 3 which may sometimes be fractured by such loads.

Although a rim having removable side flange rings is shown for the purpose of illustrating the invention, this invention is equally applicable to a rim having side flanges which are an integral part of the rim base and bead seat band, respectively. Various other changes can be made in the illustrative embodiments shown herein without departing from the scope of the invention.

What is claimed is:

1. A multiple-piece vehicle wheel rim for mounting a tire thereon comprising:
   (A) an annular rim base having
      (1) an annular radially outwardly facing gutter along one edge thereof,
      (2) an annular radially outwardly facing lock ring seating surface adjacent the axially inner edge of the gutter,
      (3) a radially outwardly extending flange along the edge of the rim base opposite the gutter, and
      (4) a tire bead seat on the radially outer face of the rim base adjacent the flange to receive one bead of the tire when mounted thereon;
   (B) a removable annular bead seat band telescopically mounted on the rim base and having
      (1) a radially outer face,
      (2) a radially inner face,
      (3) a flange extending radially outwardly from the axially outward edge of said bead seat band,
      (4) a beveled seating surface located at the axially outer and radially inner corner of the bead seat band, said beveled surface lying radially outwardly from the lock ring seating surface on the rim base when the bead seat band is assembled thereon, and
      (5) a tire bead seat on the radially outer face of the bead seat band adjacent the flange to receive one bead of the tire mounted thereon;
   (C) an annular elastomeric seal ring between the rim base and the bead seat band; and
   (D) an annular transversely split lock ring of substantially "L" shaped cross section having
      (1) a body portion extending radially inwardly into the gutter of the rim base to prevent axially outward movement of the lock ring and the bead seat band on the rim base,
      (2) an integral annular rib extending axially inwardly from the body portion and engaging the beveled seating surface of the bead seat band and the lock ring seating surface to provide positive concentric positioning of the bead seat band with respect to the rim base and to transmit loads from the bead seat band to the lock ring seating surface on the rim base and
      (3) all the area of contact between the lock ring and the rim base being in the gutter of the rim base and axially inwardly thereof.

2. The vehicle rim of claim 1 in which the axially inwardly extending rib of the lock ring has a lower face which seats against the lock ring seating surface on the rim base and an upper face which seats against the beveled seating surface on the bead seat band to direct a substantial portion of the radial forces from the bead seat band to the rim base.

3. The vehicle rim of claim 2 in which the seating surfaces of the upper and lower sides of the lock ring rib are inclined at an acute angle to each other.

4. The vehicle rim of claim 3 in which the seating surfaces of the lock ring seat against the entire circumference of the seating surfaces of the bead seat band and the rim base.

5. The vehicle rim of claim 4 in which the body portion of the lock ring has a rounded edge which permits the lock ring to roll axially inwardly when said lock ring is seated in the gutter.

References Cited

UNITED STATES PATENTS

| | | | |
|---|---|---|---|
| 2,802,508 | 8/1957 | Brink | 152—410 |
| 2,822,017 | 2/1958 | Herzegh | 152—362 |
| 2,835,303 | 5/1958 | Woodward | 152—410 |

FOREIGN PATENTS 108,175   11/1923   Germany.

ARTHUR L. LA POINT, *Primary Examiner.*

Y. P. SCHAEVITZ, *Assistant Examiner.*